Aug. 26, 1952     R. H. FINDLAY     2,608,311
CAR UNLOADING APPARATUS
Filed Nov. 29, 1946     7 Sheets-Sheet 1

INVENTOR
R. H. FINDLAY
By Johnstonhaugh &Co.
ATTORNEYS

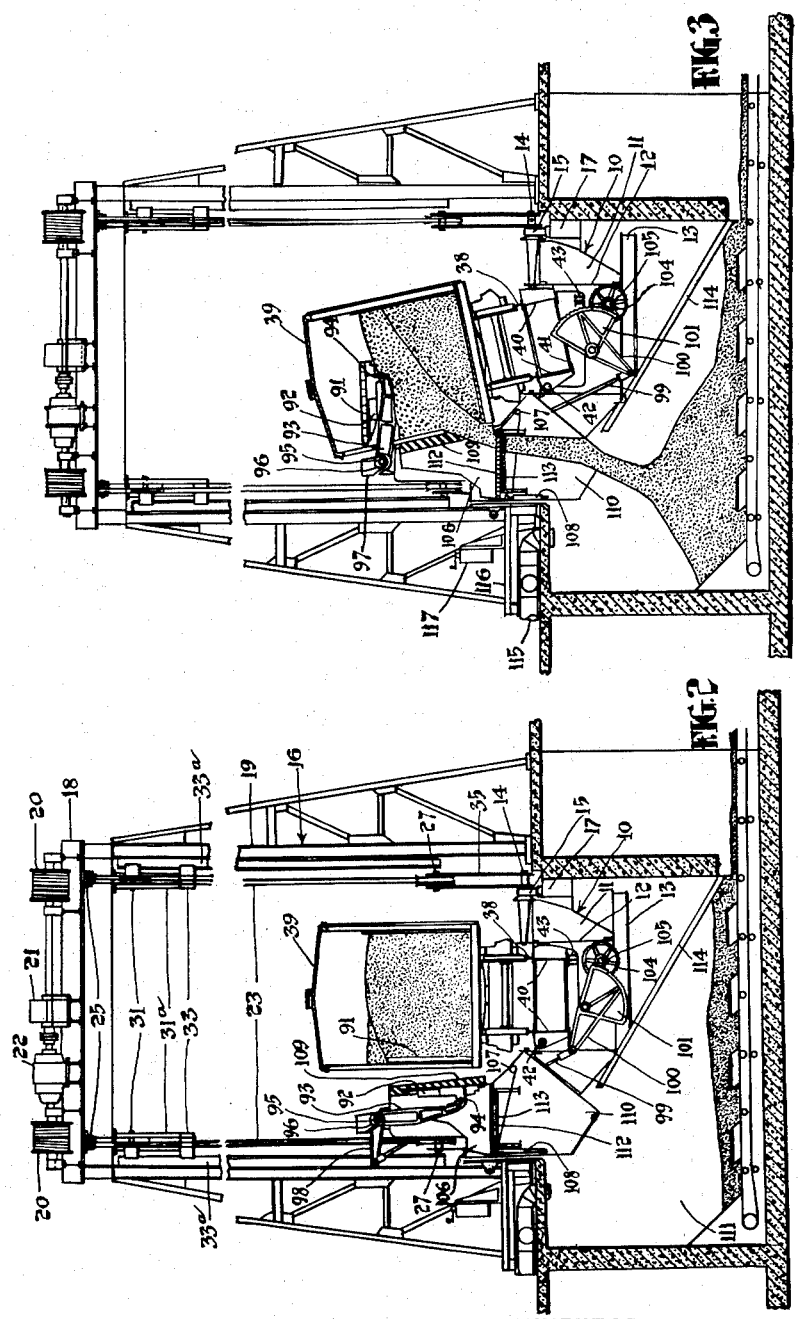

INVENTOR
R.H. FINDLAY
BY Fetherstonhaugh & Co.
ATTORNEYS

Aug. 26, 1952 — R. H. FINDLAY — 2,608,311
CAR UNLOADING APPARATUS
Filed Nov. 29, 1946 — 7 Sheets-Sheet 6

INVENTOR
R. H. FINDLAY
by Fetherstonhaugh & Co.
ATTORNEYS

Aug. 26, 1952 — R. H. FINDLAY — 2,608,311
CAR UNLOADING APPARATUS
Filed Nov. 29, 1946 — 7 Sheets-Sheet 7

INVENTOR
R. H. FINDLAY
Fetherstonhaugh & Co.
ATTORNEYS

Patented Aug. 26, 1952

2,608,311

UNITED STATES PATENT OFFICE 2,608,311

CAR UNLOADING APPARATUS

Reginald H. Findlay, Montreal, Quebec, Canada, assignor to Dominion Bridge Company Limited, Lachine, Quebec, Canada Application November 29, 1946, Serial No. 712,865

7 Claims. (Cl. 214—55)

This invention relates to a car unloading apparatus for unloading box cars of grain whereby a car supporting structure is tiltably mounted over a grain pit in open top bearings supported by a suitable foundation and a hoisting tower is mounted on the foundation to straddle the car supporting structure.

A particular object of this invention is to provide a tiltably mounted cradle structure having two pairs of trunnions projecting laterally from opposite sides thereof which are supported in stationary open top bearings mounted on a foundation to permit either end of the cradle structure to be raised.

A further object is to provide a hoisting means, carried by the hoisting tower which is selectively operable to raise either pair of trunnions clear of the open top bearings to thereby incline the cradle structure and a car supported thereon about a transverse axis afforded by the remaining pair of trunnions and their bearings.

A further object of this invention is to provide a cradle structure with retractable end lock members carried by the ends of the cradle structure which are adapted to be projected into engagement with abutments located at opposite ends of the pit to prevent inclination of the cradle structure when the apparatus is not in use and to take the end reactions due to cars being moved on or off the cradle structure and to be retracted when the car is held in place.

A further object is to provide car end clamping means carried by the ends of the cradle structure which are adapted to be moved in a horizontal direction towards the bumpers of a car for centering the car in clamping engagement. The clamping means are provided with end lock actuating means for disengaging the end lock members during the clamping operation and for engaging the end lock members with the abutment walls when the clamping means are moved to an inoperative position.

A further object is to provide a grain door opening mechanism carried up from one side of the cradle structure which will break in and raise the door clear of the grain in the car.

A still further object of this invention is to provide a suitably mounted primary cradle structure, adapted to be end tilted on open top bearings, with a secondary cradle structure pivotally connected to one side of the primary cradle structure to provide for side tilting of the secondary cradle structure. The secondary cradle structure is positioned within the primary cradle structure and carries full-length rails onto which the car is run.

Another object of this invention is to provide actuating means coactive for side tilting the secondary cradle structure and operating the door opening mechanism.

The apparatus as set forth requires a much shallower pit below it and a more simple foundation structure than other existing grain car unloaders. It can also be placed over most of the present hoppers and conveyors for unloading by hand and power shovels and is designed to minimize trouble which arises from dust.

In operation, a car is run onto the cradle structure while the locking members hold it firmly in place. The car is then clamped in a central position lengthwise of the track while the locking members are disengaged. The outer car door has in the meantime been opened. When the car is properly centered it is then side tilted on secondary cradle structure to an angle of about 12°. At the same time the door opener breaks in the grain door and raises it above the grain inside the car. As soon as the door is broken open the grain begins to flow from the car into a chute which guides it into a hopper below the apparatus. A considerable portion of the grain in the car flows out at this stage.

The car is then tilted endwise to about 45° by lifting one end of the primary cradle structure while the secondary cradle structure remains side tilted. When the grain ceases to flow that end is lowered to its horizontal position. The other end is then raised and then lowered when the grain ceases to flow. By this time the most of the grain has been removed and what is left is all at one end of the car. A light baffle is then placed diagonally across the car resting against one door post and the opposite side of the car. The car is then tilted endwise and the remaining grain is directed out through the door of the baffle.

The car is then brought to its horizontal position and the baffle removed. The secondary cradle structure is then lowered to its horizontal position while the door opener is withdrawn. The end clamps are withdrawn to an inoperative position, the end locking members are moved into locking engagement and the empty car is removed.

Other objects, features and characteristic advantages of this invention will be more readily understood from the following detailed description taken in connection with the accompanying drawings, in which—

Figure 2 is an end elevation taken through the section line of 2—2 of Figure 1, after the car has been centered.

Figure 3 is a view similar to Figure 2 but showing the secondary cradle structure side-tilted and the door opener mechanism after it has broken in the door and raised it above the grain.

Figure 1:
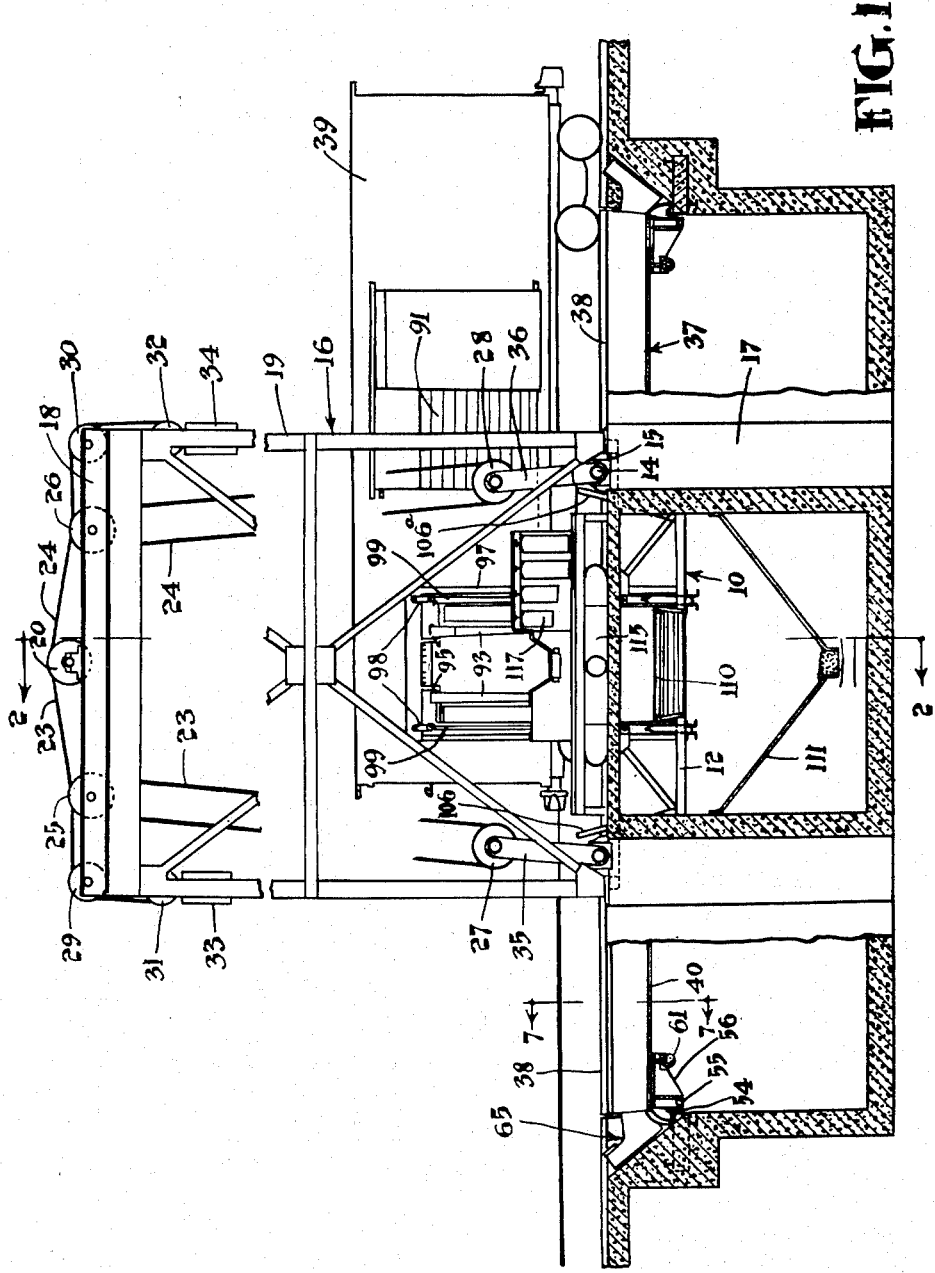
Figure 1 is a side elevational view with a portion of the tower broken away of the car unloading apparatus and showing the end locks in locking engagement while a car is being rolled thereon.
Figure 4:
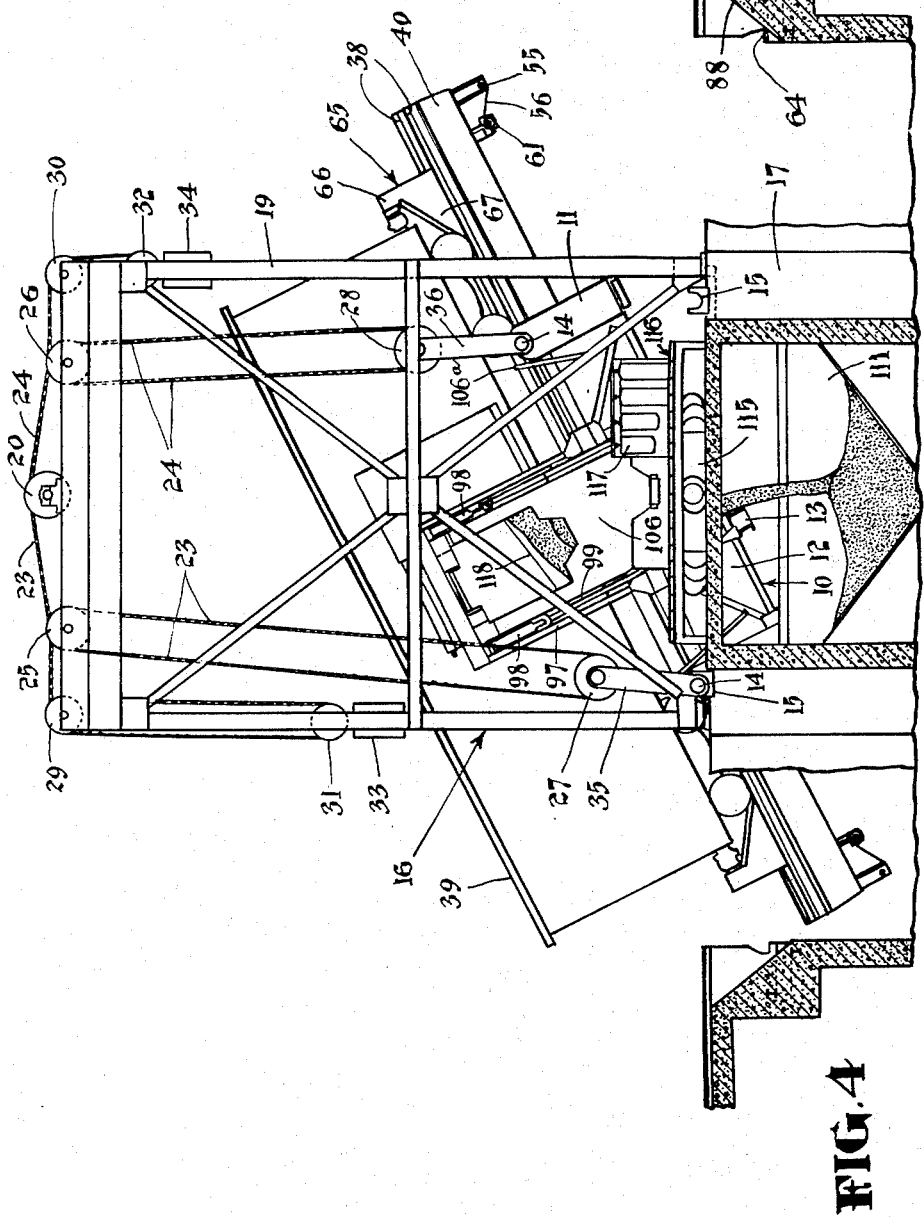
Figure 4 is a side elevational view of car unloading apparatus showing the car held in clamping engagement while it is side and end tilted.
Figure 5:
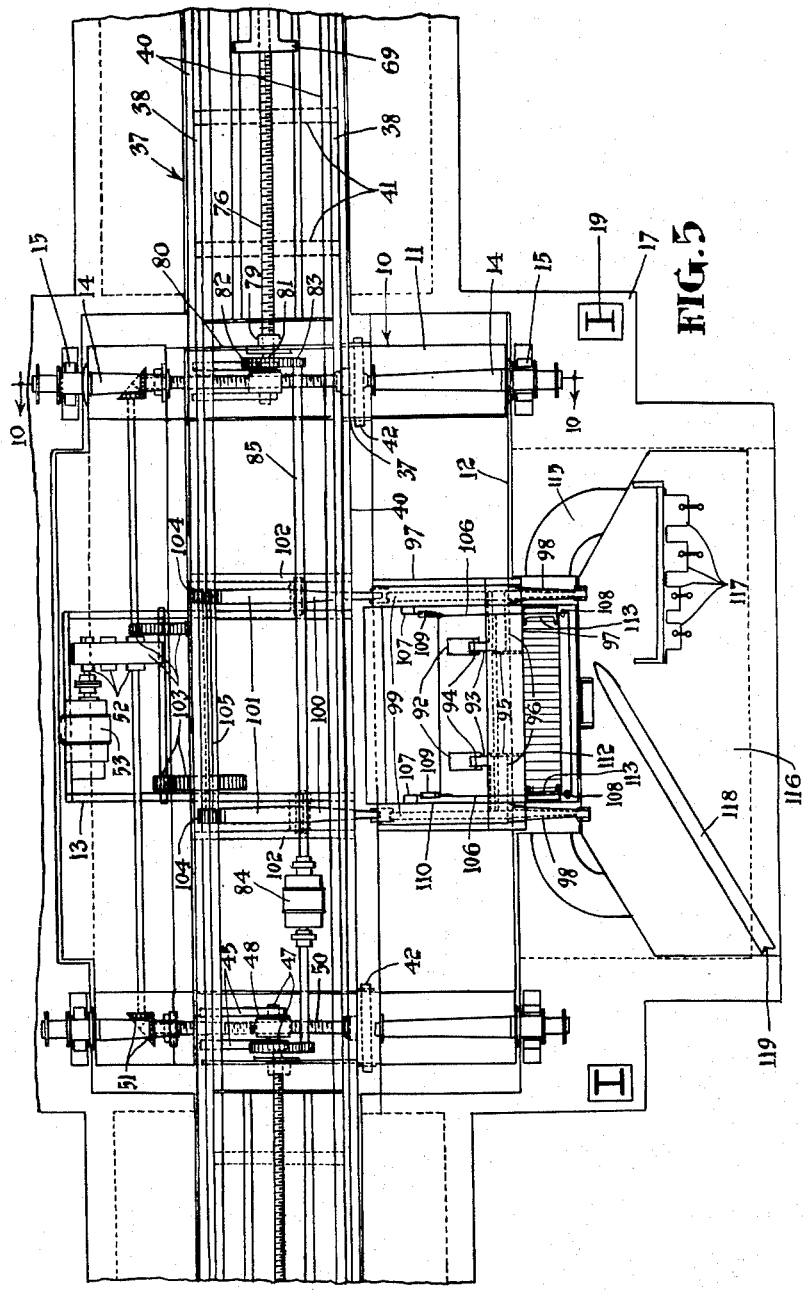
Figure 5 is a top plan view with the tower removed of the main portion of the car unloading cradle structure.
Figure 6:
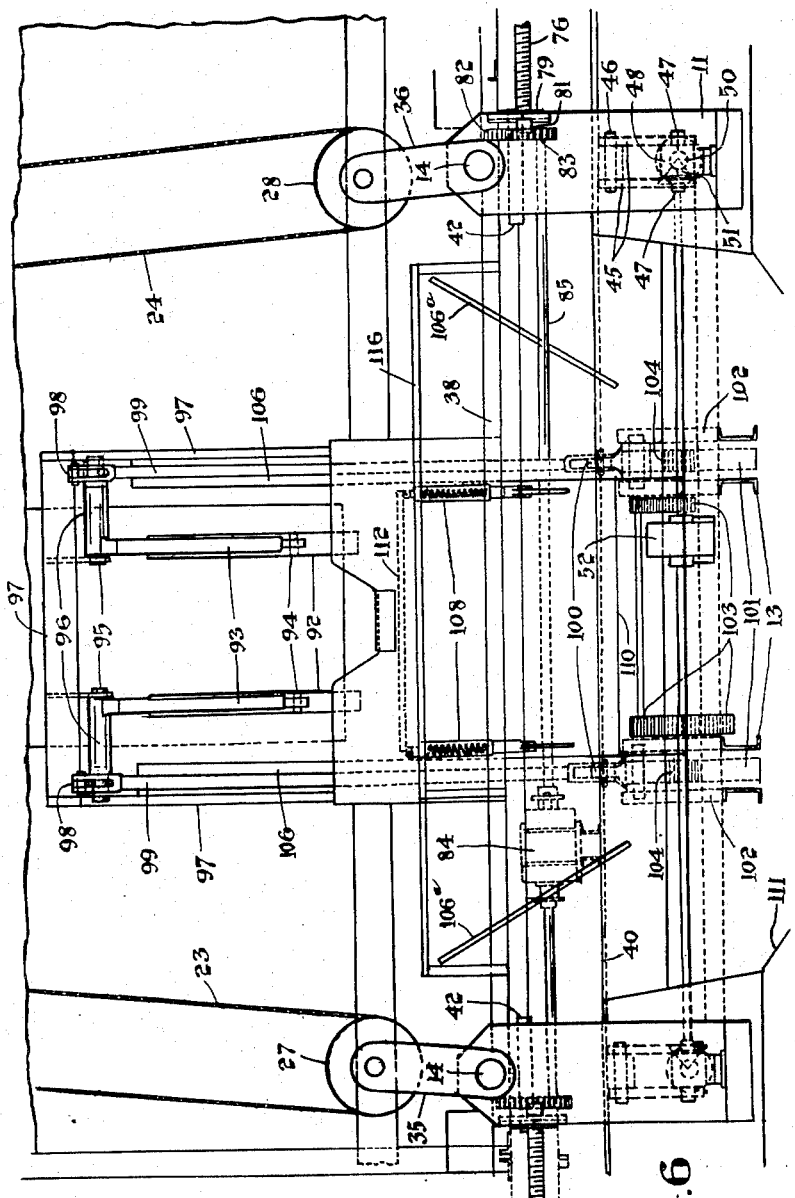
Figure 6 is a side view in section (enlarged) of the primary cradle structure and door-opener mechanism and also showing the relationship of the side-tilting mechanism of the secondary cradle structure and the door opener mechanism.
Figure 7:
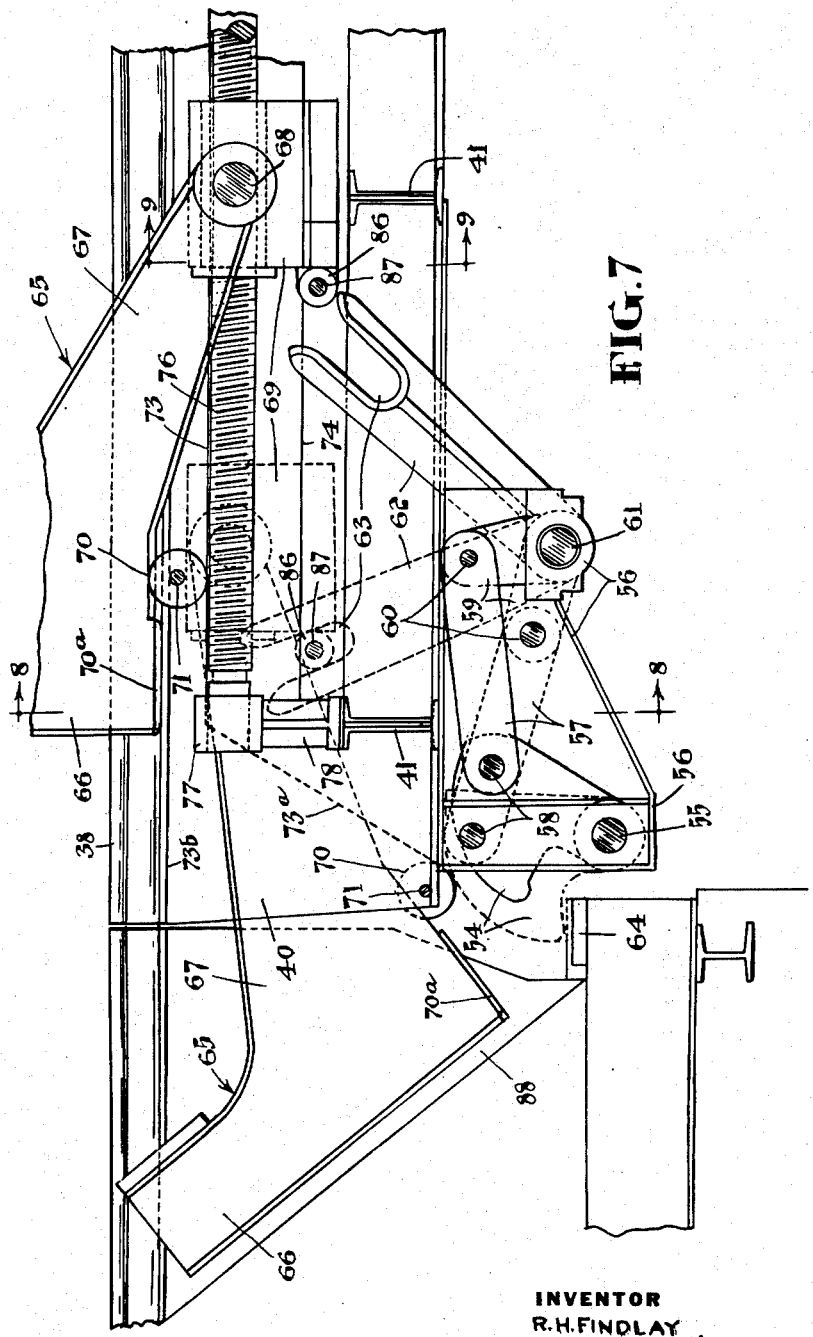
Figure 7 is a fragmentary sectional view taken along the line 7—7 of Figure 8, to show the details of the car end clamping means and end lock members illustrated in Fig. 1.
Figure 8:
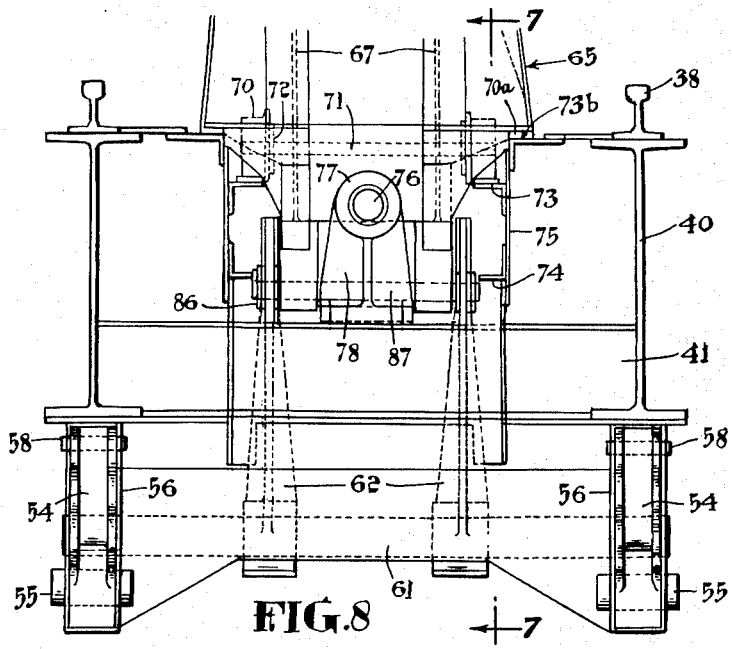
Figure 8 is a sectional view along the lines 8—8 of Figure 7.
Figure 9:
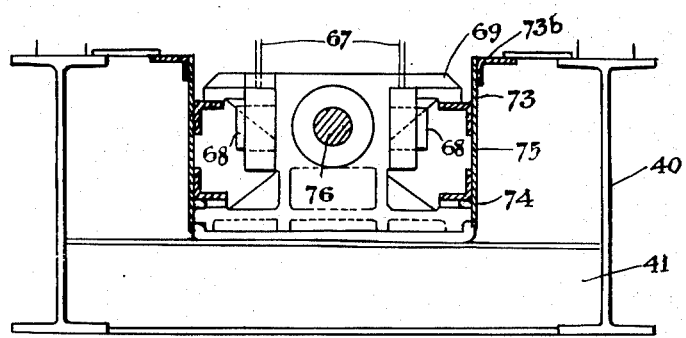
Figure 9 is a sectional view along the lines 9—9 of Figure 7.
Figure 10:
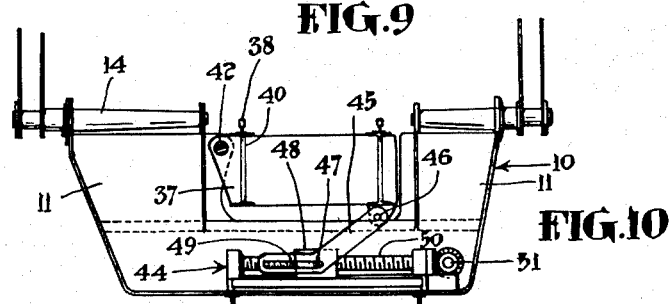
Figure 10 is a sectional view in end elevation along the lines 10—10 of Figure 5 showing the relative positions of the primary and secondary cradle structures and the side tilt mechanism of the secondary cradle structure.

In the accompanying drawings, 10 designates a primary cradle structure consisting of two cross girders 11 connected on each side by means of two lattice girders 12 which are braced together on their bottom flanges by brace members 13. The cross girders 11 carry four main trunnion pins 14. These trunnion pins support the whole moving structure and grain car on four open top bearings 15 mounted on a concrete base 17. The structure is rocked endwise by lifting one end off its bearings while it rests on the other pair of bearings.

An end tilt mechanism is mounted on a tower structure 16 arranged on concrete base 17 to straddle the primary cradle structure. The end tilt mechanism consists of a rope hoist carried on a steel platform 18 supported on four braced columns 19 of the tower structure. The platform carries two hoisting drums 20 driven through gearing 21 by an electric motor 22 which is provided with a solenoid brake. Each drum carries a pair of ropes 23 and 24. Rope 23 passes over and around multiple sheave 25 and multiple sheave 27 over sheave 25 and thence around multiple sheave 29 and sheave 31 again around sheave 29 to be connected at its free end to rope take-up weight 33 in any suitable manner (not shown). Rope 24 passes over and around multiple sheave 26 and multiple sheave 28 over sheave 26 and thence around multiple sheave 30 and sheave 32 again around sheave 30 to be connected at its free end to rope take-up weight 34 in any suitable manner. Sheaves 25, 26, 29, and 30 are mounted on platform 18. Sheaves 27 and 28 are mounted in rocking links 35 and 36 connected to the trunnion pins 14. Sheaves and weights 31, 33 and 32 and 34 are respectively enclosed in frames 31a which are slidable on vertical rail members 33a secured to the inner side of columns 19. When hoisting one end of the primary cradle structure the first effect is to raise the two rope take-up weights at that end a few inches until the frames come against stops constituting the under side of platform 18. This has the effect of dead-ending the ropes. The drums then proceed to hoist the desired end of the primary cradle structure. At the same time the drum pays out the ropes connected to the other end. The end of each of these last mentioned ropes being connected to take-up weights are kept from becoming slack.

A secondary cradle structure 37 is carried by and projects beyond the ends of the primary cradle structure the full length of the grain pit over which it is supported. The secondary cradle structure, which carries the tracks 38 onto which a grain car 39 is run, consists of two longitudinally extending girders 40 rigidly braced together by cross girders 41. One side of the secondary cradle structure 37 is hinged or pivotally connected to the cross girders 11 of the primary cradle structure 10 by means of two hinge pins 42 to permit the secondary cradle structure to be tilted sideways on the primary cradle structure for side tilting of the car. The other side is supported by a seat 43 carried by cross girder 11 of the primary cradle structure.

The secondary cradle structure 37 is side tilted about its pivotal connection 42 to the primary cradle structure by tilting means 44 carried by the primary cradle structure 10. The side tilt is accomplished by raising the side of secondary cradle structure opposite to the side connected to the primary cradle structure by pivotal hinge connection 42. The raising of one side is accomplished by two pairs of L-shaped struts 45, each pair of struts being connected at one end to the under side of the secondary cradle structure 37 by pin 46, and the other end connected to trunnions 47 on a travelling nut 48 through slots 49 in the lower arm of the struts. The travelling nut 48 is moved by a screw 50 carried by cross girders 11 of primary cradle structure 10. The screw 50 is operated through bevel gearing 51, also carried by girder 11, and through spur gearing 52 by an electric motor 53. The spur gearing and motor is carried by brace members 13 of the primary cradle structure. The upper arms of each pair of struts 45 may be rigidly secured together by any suitable means. The slot 49 in the lower arm of each strut provides for a delayed action of the travelling nut 48 in side tilting of the secondary cradle structure.

Releasable end locks are carried by the ends of the secondary cradle structure, said locks being engageable with the abutment walls of the pit. The end locks consist of a pair of claw shaped members 54, each claw being pivotally secured by pin 55 to supporting bracket 56 fastened to the under side of girder 40. Each claw 54 is operated by a toggle and lever mechanism consisting of a link 57 having one end pivotally connected to the top of the claw by pin 58 and the other end pivotally connected to a second link 59 by pin 60, the second link having its other end rigidly secured to one end of a toggle bar 61 carried by brackets 56. A pair of levers 62 are rigidly secured to said toggle bar in the intermediate portion and are spaced to coact with an operating means receivable in yoke 63 provided in the free end of said levers, said operating means being carried by an end clamping mechanism. When the levers are moved outwardly they actuate the toggle mechanism which rotate claws 54 about pivotal pin 55 into locking engagement with seats 64 in the concrete abutment walls of the pit. When the levers are moved inwardly the claws are disengaged from the seat 64 and withdrawn between brackets 56 to free them from contact with the abutment walls during the end tilting operation. The claws are normally engaged with the seats in the abutment walls when the machine is not in use to take the end reactions due to cars being moved on and off the cradle, and are released when the car is held in place by a car end clamping mechanism.

A car end clamping mechanism is carried by each end of the secondary cradle structure for engaging the car bumpers to center the car in locking engagement against movement due to end tilting. The clamping mechanism consists of an L-shaped clamp 65 comprising an upright car clamping block 66 and a pair of arms 67 extending therefrom having their free ends mounted on trunnions 68 carried by a travelling nut 69. Clamp 65 is provided with a pair of rollers 70 mounted on a shaft 71 carried by suitable brackets 72 on the under side of said clamp and a pair of bronze shoes 70a. Upper and lower longitudinally extending guide rails 73, 73b and 74 are secured to inner side walls 75 connected to the girders 40 of the secondary cradle structure. The clamp rollers 70 travel up the ramps 73a at the outer ends of the upper guide rails 73 raising the clamp from its inoperative position. When the clamp reaches a horizontal position the rollers are lifted off their guides by shoes 70a, which slide along guides 73b. The travelling nut 69 slides along the guide rails 73 and 74 with the crosshead bearing on the top and bottom surfaces respectively of said guide rails. The nut is moved along the guide rails by a screw 76 having its outer end journalled in a bearing 77 mounted on bracket 78 carried by cross girder 41 of the secondary cradle structure. The other end of screw 76 is journalled in a ball thrust bearing 79 secured to crossbeams 80 carried by girders 40. The screw forms, at its end, a cantilever gear shaft 81 carrying spur gear 82. Gear 82 meshes with pinion 83 connected to a motor 84 by shaft 85 which is located on one side of the center line of the secondary cradle structure. The travelling nut 69 also carries a pair of end lock actuating rollers 86 on a shaft 87 to coact with levers 62 for operating the end lock mechanism.

The clamp member 65 when not in use is submerged into a recess 88 in the end wall of the pit so that the clamping block 66 is below the level of the car rails 38, the rollers 70 being at the bottom of ramp 73a. In this position the travelling nut 69 is relatively close to the outer screw bearing 77 with end lock actuating rollers 86 engaging yoke portions 63 of lever 62. Levers 62 have been moved outwardly and end lock claws 54 are in locking engagement with seats 64 in the concrete abutment walls of the pit. When a car has been rolled onto the cradle structure the car end clamping mechanism is set in motion. The screw 76 operated by motor 84 through gearing 82 and 83 moves the travelling nuts 69 toward the center. In the first part of the motion of travelling nuts 69, the rollers 70 riding up the ramps 73a raise clamp members 65 out of recesses 88 to bring the blocks 66 in an upright position. At the same time the end lock actuating rollers 86 begin to move levers 62 inwardly, thus withdrawing the end locks 54 so that, when the car is clamped, the secondary cradle structure is free to be tilted endwise. When the clamps 65 are raised they are moved inwardly to position the car in locking engagement by the further inward movement of the nuts 69, the shoes 70a sliding on guide rails 73b. To remove the car, a reverse movement of nut 69 moves the clamps 65 outwardly until they descend the ramps 73a into recesses 88. At the same time, end lock actuating rollers 86 coact with levers 62 to move the end locks into locking engagement with the seats in the abutment walls.

After the outer door of the car has been opened the grain door 91 is broken in by a door opener mechanism carried by the primary cradle structure. The door opener mechanism comprises a pair of pressure arms 92 adapted to engage the full depth of a grain door, each pressure arm being hinged to the lower end of a lever arm 93 by a hinge pin 94 so that they can accommodate themselves to the door and also let the door clear the car roof when the lever arms reach the limit of their travel. Each lever arm 93 has a hub 96 at its upper end journalled to a fixed shaft 95. Each shaft is supported by a frame 97 which is carried up from one side of the primary cradle structure. A horizontally extending crank arm 98 is secured to the outer end of hub 96. A link 99 connects the other end of each crank arm 98 with an arm 100 of a quadrant 101 mounted on a stand 102 which is carried by brace member 13 of the primary cradle structure. The quadrants are operated by a single motor 53 through a series of spur gears 52 and 103 to a pair of pinions 104 mounted on a common shaft 105 to mesh with said quadrants.

The door opener mechanism and the side tilting mechanism operate from a single motor through a cooperating system of gears. At the commencement, the quadrants move the pressure arms 92 toward the car door and bursts it inwards. At the same time travelling nuts 48 of side tilt mechanism 44 are taking up the lost motion in slots 49 of side tilting struts 45. Just after the door has been burst inward, nuts 48 acting against struts 45 begin to side tilt the secondary cradle structure. From there on both the door opening and side tilting operations continue simultaneously until they have reached their limits. When the car has been unloaded, the motor is reversed to return the door opener and side tilting mechanisms to their starting positions. The grain door removes itself from the pressure arms by contacting the door jams when the pressure arms are withdrawn from the car. In the preferred embodiment of this invention I have shown and described a door opener and a side tilting mechanism which cooperate through a system of gearing to a single motor. It is to be understood, however, that I may desire to operate the door opener mechanism and the side tilting mechanism by independent means within the scope of this invention.

Supported on the two brackets 97, which carry the door opener mechanism, are two flexibly mounted spring applied steel baffles 106 which guide the grain into a grain chute. The baffles are hinged at their inner bottom edges to the brackets by hinge pin 107 and are supported at their outer bottom edges by compression springs 108. These baffles have soft nosing strips 109 along their inner edges which are pressed against the car on each side of the doorway by compression springs 108 when the car is tilted sideways against them. A pair of side baffles 106a are secured to the primary cradle structure to direct any grain to the pit which may spill due to end tilting.

A steel plate chute 110 of rectangular section is positioned beneath the door baffles, the side walls being brought up to meet said baffles. A bottom wall is inclined at about 45° and projects well under the car. The lower end of the chute projects into an opening in the top of a receiving hopper 111 to direct the grain through this opening.

A door platform 112 made of grating, to permit the grain to flow through it, is placed over chute 110 and is supported on brackets 113 carried by said chute. This platform provides access to the car door for the operator.

The chute and door baffle arrangement described above cuts down all openings around the grain flowing into the hopper to a minimum. A dust baffle plate 114 is placed in the hopper to direct the dust to suitable suction pipes 115 which draw off the dust and thus prevent it from getting into the surrounding atmosphere.

The operator normally works from a fixed platform 116 on the foundation immediately in front of door platform 112. The platform 116 carries four controllers 117, one for the end clamps and end locks, one for the side tilt and door opener, and two for the end tilt mechanism, one being for each direction of the tilt. A car baffle 118 normally resting on the operator's platform is inserted in the car previous to the final end tilt. A V-shaped socket 119 at the outer end of the car baffle rests against one door jam, the other end resting against the far side of the car. In this position the baffle is at approximately 45° to the center line of the car and rests on the car floor. When the car is given its final end tilt the baffle prevents any grain from flowing to the lower end and directs it out through the door.

I claim:

1. In a car unloading apparatus, a tiltably mounted car supporting structure, means operable for selectively raising one end of said tiltable structure for inclination of said structure and a car supported thereon, stationary abutments and recessed portions located at opposite ends of the car supporting structure, supporting brackets carried by the ends of said structure, retractable end lock members having one end pivotally connected to said supporting brackets and the other end provided with a hook portion adapted to be projected into locking engagement with said abutments to prevent the aforesaid inclination of the car supporting structure until after the end lock members have been retracted from engagement, operating means for projecting and retracting said end locks including a toggle bar carried by said car supporting structure, a link rigidly secured to said toggle bar, a second link having one end pivotally connected to said first mentioned link and the other end pivotally connected to an intermediate portion of an end lock, and an operating lever having one end rigidly secured to said toggle bar, the free end of said lever being provided with a yoke, a further operating means receivable in said yoke to actuate said operating lever, retractable car end clamping members carried by the ends of said car supporting structure adapted to be retracted into said recessed portions when not in clamping engagement and to be withdrawn from said recessed portions and moved in a horizontal direction toward the bumpers of the car for centering said car in clamping engagement, operating means for withdrawing said clamping members from said recessed portions and moving them into and out of clamping engagement with said car bumpers and retracting them into said recessed portions, said last mentioned means being provided with said operating means receivable in said yoke to retract the end locks during the clamping operation of the car end clamps and to project the end locks into locking engagement with said abutments during the disengagement operation of said car end clamps with said car.

2. A car unloading apparatus of the character described comprising a cradle member provided with longitudinally extending track rails, means mounting said cradle for side tilting about a longitudinally extending axis and means for tilting said cradle comprising rotatably mounted screw shafts, travelling nuts arranged on the screw shafts in threaded engagement therewith and strut members arranged to be moved by travelling movement of said nuts and acting against said cradle to tilt the cradle about said axis in response to travelling movement of said nuts.

3. In a car unloading apparatus, a tiltably mounted car supporting primary cradle structure, a secondary cradle structure carried by said primary cradle structure, said secondary cradle structure being adapted to directly support a car thereon, one side of said secondary cradle structure being pivotally secured to the adjacent side of the primary cradle structure to provide a fixed longitudinally extending pivotal axis about which the secondary cradle structure is tiltable relative to the primary cradle structure, and tilting means acting against the remaining side of the secondary cradle structure to effect side tilting of said secondary cradle structure about its axis, said tilting means comprising a travelling nut carried by the primary cradle structure at each end thereof, strut members moveable by said travelling nuts and having their upper ends engageable with said secondary cradle structure and adapted to rotate said secondary cradle structure about the pivotal axis and operating means for moving said travelling nuts.

4. In a car unloading apparatus of the character described, a tiltably mounted car supporting primary cradle structure provided with a central opening and provided with means normally disposed to support the cradle structure in a horizontal position, a secondary cradle structure carried by the primary cradle structure within the central opening thereof and projecting beyond the ends of the primary cradle structure, said secondary cradle structure being provided with longitudinally extending rail members onto which a grain car is run, one side of said secondary cradle structure being pivotally secured to the adjacent side of the primary cradle structure to provide a fixed longitudinally extending pivotal axis about which the secondary cradle structure is tiltable relative to the primary cradle structure and tilting means acting against the remaining side of the secondary cradle structure to effect side tilting of said secondary cradle structure about its axis, stationary abutments located at opposite ends of the secondary cradle structure, supporting brackets carried by the ends of said secondary cradle structure, claw-shaped retractable end lock members having a hook portion on one end and the other end pivotally connected to said supporting brackets, the hook portion of the claw-shaped end locks being adapted to be projected into locking engagement with said abutments to prevent inclination of the primary and secondary cradle structures until after the end locks have been retracted from engagement with said abutments and operating means for projecting and retracting said end locks.

5. In a car unloading apparatus, a tiltably mounted car supporting structure, means operable for selectively raising one end of said tiltable structure for inclination of said structure and a car supported thereon, stationary abutments located at opposite ends of the tiltable car supporting structure, supporting brackets carried by the ends of said structure, claw-shaped retractable end lock members having a hook portion at one end and the other end pivotally connected to said supporting brackets, the hook portion of the claw-shaped end locks being projectable into locking engagement with said abutments to prevent the aforesaid inclination of the car supporting structure until after said end locks have been retracted from engagement with said abutments and operating means for projecting and retracting said end locks.

6. In a car unloading apparatus, a tiltably mounted car supporting structure, means operable for selectively raising one end of said tiltable structure for inclination of said structure and a car supported thereon, stationary abutments located at opposite ends of the car supporting structure, supporting brackets carried by the ends of said structure, claw-shaped retractable end lock members having a hook at one end and the other end pivotally connected to said brackets, the hook portion of the claw-shaped end locks being projectable into locking engagement with said abutments to prevent the aforesaid inclination of the car supporting structure until after said end locks have been retracted from engagement with said abutments, and operating means for projecting and retracting said end locks comprising a toggle bar carried by said car supporting structure, a link rigidly secured to said toggle bar, a second link having one end pivotally connected to said first mentioned link and the other end pivotally connected to an intermediate portion of an end lock, and an operating lever having one end rigidly secured to said toggle bar, the free end of said lever being provided with a yoke and a further operating means receivable in said yoke to actuate said operating lever.

7. In a car unloading apparatus, a primary car supporting cradle mounted for endwise tilting, a secondary cradle mounted on said primary cradle for independent side tilting, said secondary cradle being adapted to directly support a car thereon, a supporting structure for a door lever mechanism carried by said primary cradle and toward which the car is moved by side tilting of said secondary cradle relative to the primary cradle and said supporting structure, a door opening lever mechanism pivoted to said supporting structure, actuating means for forcing said lever mechanism against the car door during tilting movement of the car relative to and toward said supporting structure, a pair of flexibly mounted spring applied baffles carried by said supporting structure for arrangement on either side of a car door, soft nose car engaging strips carried by said baffles and compression springs mounted on the supporting structure and connected to said baffles to exert pressure contact of the baffles with the car.

REGINALD H. FINDLAY.

REFERENCES CITED

The following references are of record in the file of this patent:

UNITED STATES PATENTS

| Number | Name | Date |
|---|---|---|
| 1,268,580 | Kidder | June 4, 1918 |
| 1,446,303 | Hill | Feb. 20, 1923 |
| 1,457,186 | Richardson | May 29, 1923 |
| 1,767,013 | Power | June 24, 1930 |
| 1,793,622 | Kidder | Feb. 24, 1931 |
| 1,938,027 | Kidder | Dec. 5, 1933 |

FOREIGN PATENTS

| Number | Country | Date |
|---|---|---|
| 299,199 | Great Britain | Oct. 25, 1928 |